(12) United States Patent
Lin et al.

(10) Patent No.: US 7,817,448 B1
(45) Date of Patent: Oct. 19, 2010

(54) POWER SUPPLY SYSTEM FOR REDUCING REVERSE CURRENT

(75) Inventors: Yung-Fu Lin, Taoyuan (TW); Chih-Hung Chen, Xinzhuang (TW)

(73) Assignee: Phihong Technology Co., Ltd., Taoyuan County (TW)

( * ) Notice: Subject to any disclaimer, the term of this patent is extended or adjusted under 35 U.S.C. 154(b) by 0 days.

(21) Appl. No.: 12/574,983

(22) Filed: Oct. 7, 2009

(51) Int. Cl.
*H02M 3/335* (2006.01)
(52) U.S. Cl. .................. 363/21.15; 363/21.16; 363/52; 363/101
(58) Field of Classification Search .............. 363/21.15, 363/21.16, 52, 101
See application file for complete search history.

(56) References Cited

U.S. PATENT DOCUMENTS 5,661,642 A * 8/1997 Shimashita .............. 363/21.15

* cited by examiner

*Primary Examiner*—Shawn Riley
(74) *Attorney, Agent, or Firm*—Muncy, Geissler, Olds & Lowe, PLLC

(57) ABSTRACT

The present invention discloses a power supply system for reducing reverse current, the system comprising a primary side circuit, for receiving alternating current; a transformer circuit, for transforming voltage; a secondary side rectifier circuit, for rectifying voltage; a secondary side filter circuit, for filtering voltage and providing direct current to a device; a first voltage division circuit, for providing a first voltage division signal; a switch circuit, for deciding the conducting condition based on the first voltage division signal and a reference voltage signal; a second voltage division circuit, for providing a second voltage division signal; and a control circuit, for deciding the charging condition based on the second voltage division signal; wherein the second voltage division circuit comprising a rectifier component and a filter component, for rectifying and filtering the source of the second voltage division signal.

14 Claims, 2 Drawing Sheets

POWER SUPPLY SYSTEM FOR REDUCING REVERSE CURRENT

FIELD OF THE INVENTION

The present invention is generally related to the field of power supply system and, more particularly, to the power supply system for reducing reverse current backflowed from a device.

DESCRIPTION OF THE PRIOR ART

With the development of science and technology, the technology related to the field of power supply (system) is progressing unceasingly. Because most of the electric devices are driven by direct current, the power supply is generally utilized for converting the alternating current to the direct current for these electric devices. The power supplies can be classified, from different points of view, for example, as linear power supply and switching regulated power supply by circuit structure, or flyback, forward, full-bridge, half-bridge, push-pull, etc. by circuit topology.

For providing better mobility and/or preventing unexpected power failure, most of the electric devices each comprise a rechargeable battery (such as a lithium cell). However, the conventional power supplies provide no solution for effectively lowering down the shortcoming of "reverse current" related to charging the rechargeable battery. The "reverse current" used herein means, as generally, that the electric current flowing back from the rechargeable battery to the power supply, which resulted from the higher voltage end of the rechargeable battery than the power supply when the power supply stops charging the rechargeable battery and does not disconnect the physical connection between the rechargeable battery. Thus, the left power within the rechargeable battery shrinks gradually.

Therefore, to mend the shortcoming mentioned above, the present invention provides a power supply system for reducing reverse current. The system with improved circuit design provides a reduced reverse current and a stable dynamic voltage response as well.

SUMMARY OF THE INVENTION

In one aspect of the present invention, a power supply system for reducing reverse current is provided, the system comprising: at least one primary side circuit, coupled to at least one alternating current power source, for receiving alternating current power; at least one transformer circuit, coupled to the at least one primary side circuit, for transforming voltage; at least one secondary side rectifier circuit, coupled to the at least one transformer circuit, for rectifying voltage; at least one secondary side filter circuit, coupled to the at least one secondary side rectifier circuit, for filtering voltage and providing power to at least one device; at least one first voltage division circuit, coupled between the at least one secondary rectifier circuit and the at least one device, for providing at least one first voltage division signal; at least one switch circuit, coupled to the at least one first voltage division circuit, for comparing the at least one first voltage division signal with at least one reference voltage signal and deciding conducting conditions of the at least one switch circuit; at least one second voltage division circuit, coupled between the at least one transformer circuit and the at least one secondary rectifier circuit, for providing at least one second voltage division signal; and at least one control circuit, coupled to the at least one second voltage division circuit, the at least one switch circuit, and between the at least one primary side circuit and the at least one transformer circuit, for receiving the at least one second voltage division signal and deciding whether to charge the at least one device or not based on the at least one second voltage division signal when the at least one switch circuit is conducted; wherein the at least one second voltage division circuit comprising at least one rectifier component and at least one filter component.

In preferred embodiments of the present invention, the system further comprises at least one primary side rectifier circuit coupled between the at least one alternating current power source and the at least one transformer, for rectifying voltage. In more preferred embodiments of the present invention, the system further comprises at least one primary side filter circuit coupled between the at least one primary side rectifier circuit and the at least one transformer, for filtering voltage In preferred embodiments of the present invention, the at least one rectifier component comprises at least one diode.

In preferred embodiments of the present invention, the at least one filter component comprises at least one capacitor.

In preferred embodiments of the present invention, the at least one secondary side rectifier circuit comprises at least one diode.

In preferred embodiments of the present invention, the at least one secondary side rectifier circuit comprises at least one Schottky barrier diode.

In preferred embodiments of the present invention, the system further comprises at least one optical coupler coupled between the at least one second voltage division circuit and the at least one control circuit.

In preferred embodiments of the present invention, the system further comprises at least one indication light coupled within the at least one second voltage division circuit.

In preferred embodiments of the present invention, the system further comprises at least one peak suppression circuit parallelly connected with the at least one secondary side rectifier circuit.

In preferred embodiments of the present invention, the at least one control circuit comprises pulse width modulation control circuit.

In preferred embodiments of the present invention, the at least one reference signal is about 2.5 V.

In preferred embodiments of the present invention, the system further comprises at least one stabilizer circuit connected with the at least one first voltage division circuit and the at least one second voltage division circuit.

In preferred embodiments of the present invention, the stabilizer circuit comprising at least one diode, at least one capacitor, at least one resistor, or combinations thereof.

By referring the following description and illustration of the embodiments of the present invention, the advantages and the spirit of the present invention can be better understood.

DESCRIPTION OF THE PREFERRED EMBODIMENT

Figure 1:
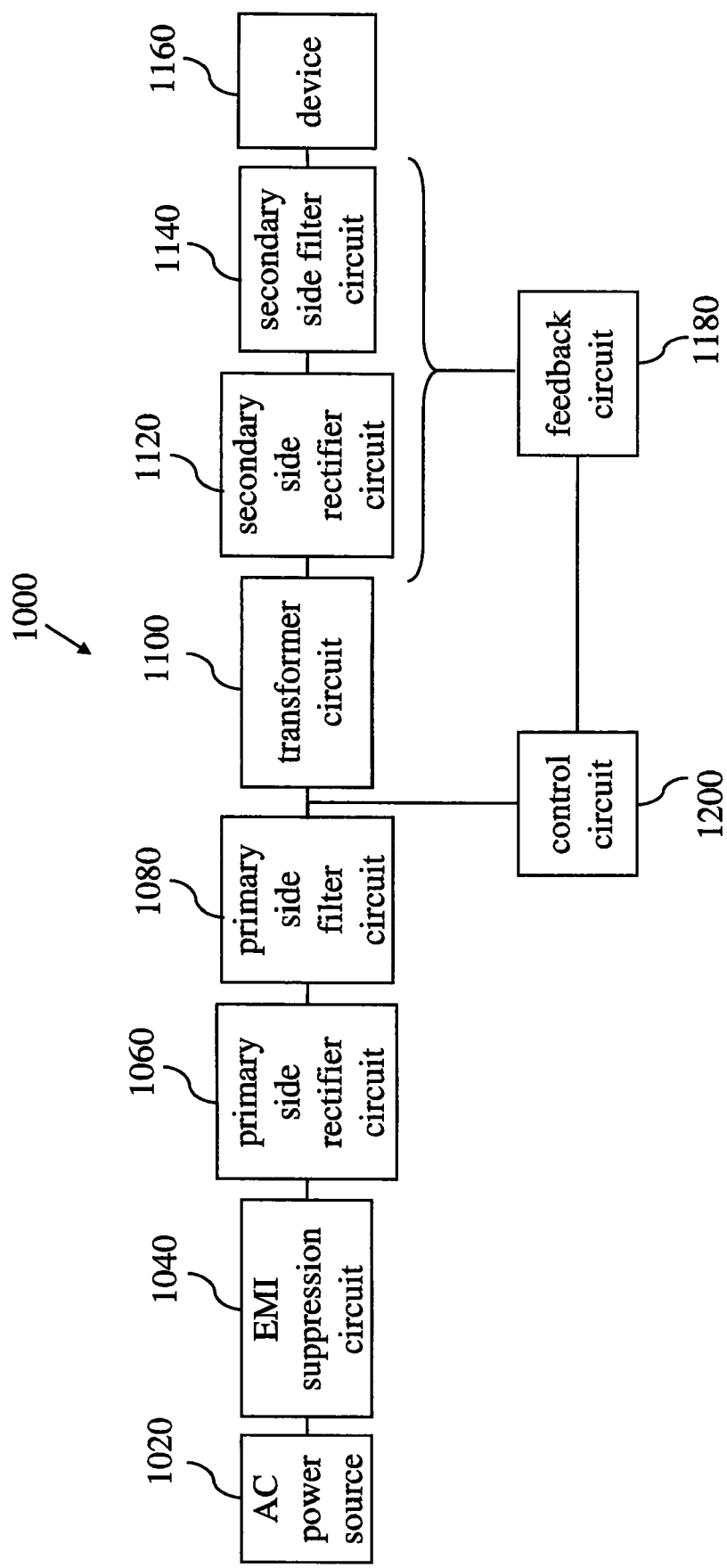
FIG. 1 illustrates the block diagram of the power supply system according to the embodiments of the present invention.

FIG. 1 illustrates the block diagram of the power supply system according to the embodiments of the present invention. In FIG. 1, the power supply system 100 comprises an electromagnetic interference (EMI) suppression circuit 1040 coupled to an alternating current (AC) power source 1020, for receiving electric power from the AC power source 1020; a primary side rectifier circuit 1060 coupled to the EMI suppression circuit 1040, for rectifying voltage at the primary side; a primary side filter circuit 1080 coupled to the primary side rectifier circuit 1060, for filtering voltage at the primary side; a transformer circuit 1100 coupled to the primary filter circuit 1080, for transforming voltage; a secondary side rectifier circuit 1120 coupled to the transformer circuit 1100, for rectifying voltage at the secondary side; and a secondary side filter circuit 1140 coupled to the secondary side rectifier circuit 1120, for filtering voltage at the secondary side and providing DC electric power for a device 1160. Wherein the power supply system 1000 further comprises a feedback circuit 1180 coupled between the transformer circuit 1100 and the device 1160, for capturing feedback signals from the secondary side; and a control circuit 1200 coupled to the feedback circuit 1180 and between the primary side filter circuit 1080 and the transformer 1100, for receiving the feedback signals from the feedback circuit 1180 and deciding whether the power supply system 1000 continues to charge (or to supply electric power to) the device 1160 or not. In some preferred embodiments of the present invention, the control circuit 1200 may be implemented as a pulse width modulation (PWM) control circuit, whereby the voltage may be stabilized via adjusting appropriate voltage outputs.

One of the improvements of the present invention according to the embodiments is the disposition of the connecting points of the feedback circuit 1180. While one of the connecting points related to the feedback circuit 1180 is coupled between the transformer circuit 1100 and the device 1160, the reverse current backflowed from device 1160 is substantially stopped by the one-way conducting property provided by the secondary side rectifier circuit 1120. The detailed description is provided as follows.

Figure 2:
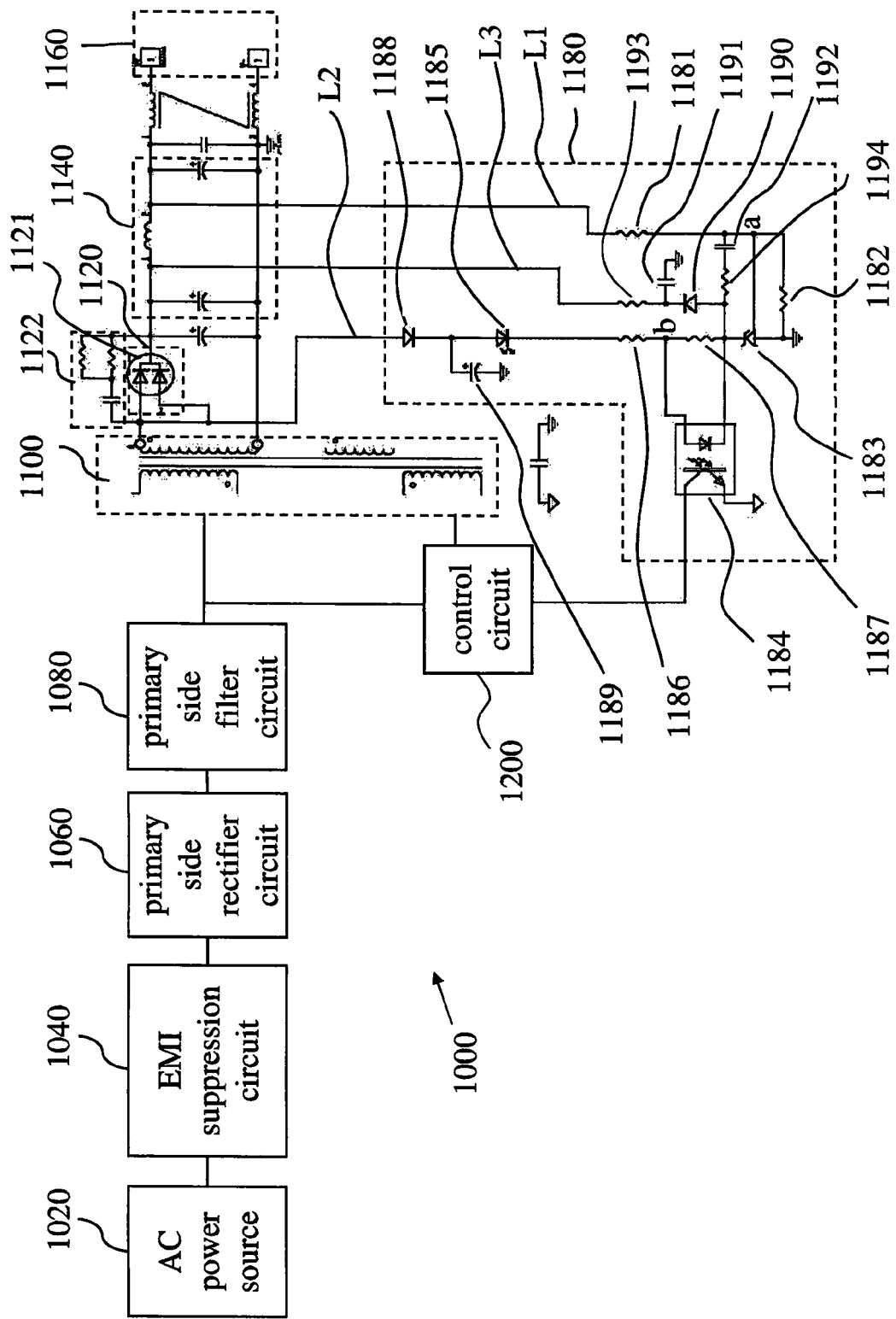
FIG. 2 illustrates the more detailed diagram of the power supply system according to the embodiments of the present invention.

FIG. 2 illustrates the more detailed diagram of the power supply system 1000 according to the embodiments of the present invention. The transformer circuit 1100 may comprise two sets of coils, wherein the lower set of coil shown in FIG. 2 is coupled to the control circuit 1200, to provide electric power with adjusted voltage for the control circuit 1200. The secondary rectifier circuit 1200 may comprise a diode 1121, and the diode 1121 may be implemented as a Schottky barrier diode in the preferred embodiments of the present invention. Thus, the diode 1121 plays the important role of not only rectifying voltage but also reducing the reverse current. The power supply system 1000 further comprises a peak suppression circuit 1122 parallelly connected to the secondary rectifier circuit 1120, for suppressing the signal peaks; a first voltage division circuit L1, comprising resistors 1181 and 1182, coupled between the secondary side filter circuit 1140 (or the secondary side rectifier circuit 1120) and the device 1160, for capturing a DC electric signal with "voltage a", having a reduced voltage, from the connecting point "a", whereby the "voltage a" is utilized to be compared with an internal reference voltage of a switching regulator 1183. When the "voltage a" is greater than the reference voltage, the switching regulator 1183 is conducted. Thus, the light intensity of a light-emitting diode (LED) within an optical coupler 1184 can be controlled according to "voltage b" captured from the connecting point "b" via a second voltage division circuit L2 comprising resistor 1186 and resistor 1187. The signal based on "voltage b" can be transferred to the control circuit 1200 via the operation of the optical coupler 1184, and thus the control circuit 1200 is utilized to decide whether to continue to supply/charge electric power to the device 1160 or not. Moreover, in preferred embodiments, the switching regulator 1183 can be implemented as a component "TL431", and the internal reference voltage may be about 2.5V. By adjusting the ratio of resistor 1181 to resistor 1182, an appropriate voltage can be selected to match the reference voltage. However, the switching regulator 1183 is not limited to the component "TL431", it can be implemented as other components with similar functionality. Further, the power supply system 1000 may comprise an indication light 1185, such as a LED, for indicating the charging conditions at the moment.

One of the improvements of the present invention according to the embodiments is when the power supply system 1000 stops to charge the device 1160, the reverse current backflowed from the device 1160 may conduct the switching regulator 1183 via the first voltage division circuit L1 but may not penetrate over the secondary side rectifier circuit 1120. Therefore, the reverse current can not reach the second voltage division circuit L2 comprising resistors 1186 and 1187, optical coupler 1184, and control circuit 1200, etc., and the electric loss caused by above-mentioned reverse current is thus greatly reduced. In the preferred embodiments of the present invention, the reverse current is smaller than 1 mA, while the reverse current in conventional power supply (system) is generally greater than 3 mA.

Because the second voltage division circuit L2 comprising resistors 1186 and 1187 is coupled "before" the secondary side rectifier circuit 1120 and the secondary side filter circuit 1140, the captured "voltage b", having relative unstable waveform, is relatively unsuitable for directly been provided for the control circuit 1200. Therefore, another improvement according to the embodiments of the present invention is lowering down the reverse current while improving the stability of the power supply system 1000 by modification on the feedback circuit 1180. In one example, in FIG. 2, the power supply system 1000 further comprises a diode 1188 and a capacitor 1189 at the front end of the second voltage division circuit L2, for stabilizing the control signal (based on "voltage b") by functionalities of rectifying and filtering. The skilled in art should appreciate that the requirement of stabilizing the voltage of a signal is different for the second voltage division circuit L2 and for the device 1160, thus adding elements such as rectifier (diode 1188) and filter (capacitor 1189) directed to the second voltage division circuit L2 for keeping in stable voltage while reducing reverse current should be the relative economic way and/or the less alternation from an existed circuit layout.

Furthermore, in some preferred embodiments of the present invention, the power supply system 1000 further comprises a stabilizer circuit L3 coupled to first voltage division circuit L1 and second voltage division circuit L2, wherein the stabilizer circuit L3 comprises a diode 1190, a capacitor 1191, a capacitor 1192, a resistor 1193 and a resistor 1194, etc., for increasing the stability of dynamic voltage response and preventing generating over shoot. Besides, the diode 1190 also presents the backflow of the reverse current.

The description above provides the preferred embodiments of the present invention. However, it is on purpose of providing thoroughly understanding of the present invention but not to limit the scope of the present invention to certain specific embodiment. It should be noted that the description above and the accompanying figures may not illustrate all the detailed components, especially the detailed conventional components, in the power supply system 1000. In addition, some of the components are illustrated in blocks, while they can be implemented in different ways. Further, some of the components may be neglected and/or some other components may be added while enabling the present invention for more adapting to different conditions. Furthermore, "a", "an", or "one" used in the embodiments does not mean the quantity of certain component is exactly one, and it may rather refer to one or more. Upon the teaching and suggestion provided by the embodiments of the present invention, many modifications and variations will be apparent to the skilled in the art. Therefore, the scope of the present invention is intended to be defined by the following claims and the equivalents.

What is claimed is:

1. A power supply system for reducing reverse current, the system comprising:
    at least one primary side circuit, coupled to at least one alternating current power source, for receiving alternating current power;
    at least one transformer circuit, coupled to said at least one primary side circuit, for transforming voltage;
    at least one secondary side rectifier circuit, coupled to said at least one transformer circuit, for rectifying voltage;
    at least one secondary side filter circuit, coupled to said at least one secondary side rectifier circuit, for filtering voltage and providing power to at least one device;
    at least one first voltage division circuit, coupled between said at least one secondary rectifier circuit and said at least one device, for providing at least one first voltage division signal;
    at least one switch circuit, coupled to said at least one first voltage division circuit, for comparing said at least one first voltage division signal with at least one reference voltage signal and deciding conducting conditions of said at least one switch circuit;
    at least one second voltage division circuit, coupled between said at least one transformer circuit and said at least one secondary rectifier circuit, for providing at least one second voltage division signal; and
    at least one control circuit, coupled to said at least one second voltage division circuit, said at least one switch circuit, and between said at least one primary side circuit and said at least one transformer circuit, for receiving said at least one second voltage division signal and deciding whether to charge said at least one device or not based on said at least one second voltage division signal when said at least one switch circuit is conducted;
    wherein said at least one second voltage division circuit comprising at least one rectifier component and at least one filter component.

2. The system according to claim 1, further comprising at least one primary side rectifier circuit coupled between said at least one alternating current power source and said at least one transformer, for rectifying voltage.

3. The system according to claim 2, further comprising at least one primary side filter circuit coupled between said at least one primary side rectifier circuit and said at least one transformer, for filtering voltage.

4. The system according to claim 1, wherein said at least one rectifier component comprising at least one diode.

5. The system according to claim 1, wherein said at least one filter component comprising at least one capacitor.

6. The system according to claim 1, wherein said at least one secondary side rectifier circuit comprising at least one diode.

7. The system according to claim 1, wherein said at least one secondary side rectifier circuit comprising at least one Schottky barrier diode.

8. The system according to claim 1, further comprising at least one optical coupler coupled between said at least one second voltage division circuit and said at least one control circuit.

9. The system according to claim 1, further comprising at least one indication light coupled within said at least one second voltage division circuit.

10. The system according to claim 1, further comprising at least one peak suppression circuit parallelly connected with said at least one secondary side rectifier circuit.

11. The system according to claim 1, wherein said at least one control circuit comprising pulse width modulation control circuit.

12. The system according to claim 1, wherein said at least one reference signal is about 2.5 V.

13. The system according to claim 1, further comprising at least one stabilizer circuit connected with said at least one first voltage division circuit and said at least one second voltage division circuit.

14. The system according to claim 13, wherein said stabilizer circuit comprising at least one diode, at least one capacitor, at least one resistor, or combinations thereof.

* * * * *